(12) United States Patent
Shimchik et al.

(10) Patent No.: US 12,698,000 B2
(45) Date of Patent: Aug. 4, 2026

(54) SYSTEMS AND METHODS FOR TRAINING A CAMERA-BASED PERCEPTION MODEL USING MACHINE LEARNING

(71) Applicants: Constructor Technology AG, Schaffhausen (CH); Constructor Education and Research Genossenschaft, Schaffhausen (CH)

(72) Inventors: Ilya Shimchik, Zurich (CH); Ruslan Mustafin, Georgia (GE); Maksim Liubimov, Belgrade (RS); Aleksandr Buival, Bremen (DE); Serg Bell, Singapore (SG); Stanislav Protasov, Singapore (SG); Nikolay Dobrovolskiy, Alanya (TR); Laurent Dedenis, Geneva (CH)

(73) Assignee: Constructor Technology AG, Schaffhausen (CH)

( * ) Notice: Subject to any disclaimer, the term of this patent is extended or adjusted under 35 U.S.C. 154(b) by 60 days.

(21) Appl. No.: 18/989,063

(22) Filed: Dec. 20, 2024

(65) Prior Publication Data

US 2026/0175867 A1    Jun. 25, 2026

(51) Int. Cl.
  B60W 60/00      (2020.01)
  B60W 50/00      (2006.01)
      (Continued)

(52) U.S. Cl.
  CPC .......... B60W 60/001 (2020.02); B60W 50/00 (2013.01); G01C 21/3811 (2020.08);
      (Continued)

(58) Field of Classification Search
  CPC .............. B60W 60/001; B60W 50/00; B60W 2554/20; B60W 2554/4029; B60W 2050/0028; B60W 2420/403; G01C 21/3859; G01C 21/3811; G01C 21/3837; G06V 20/58; G06V 10/7715; G06V 10/82; G06V 10/751; G06V 10/26; G06V 10/774
      (Continued)

(56) References Cited

U.S. PATENT DOCUMENTS

2023/0230385 A1 *  7/2023  Tananaev ............... G06V 10/44
                                              348/148
2025/0086469 A1 *  3/2025  Kim .......................... G06N 3/09
      (Continued)

FOREIGN PATENT DOCUMENTS

EP          3761226 A1 *  1/2021  ............. G01C 21/32
WO    WO-2020240274 A1 * 12/2020  ......... G01C 21/3446

*Primary Examiner* — Tuan C To
(74) *Attorney, Agent, or Firm* — ArentFox Schiff LLP; Michael Fainberg

(57)          ABSTRACT

Systems and methods include detecting obstacles and drivable areas by an autonomous vehicle by inputting image and map data into a neural network to extract feature vectors. A transformer encoder converts these vectors from camera space to Bird's Eye View (BEV) space. A detection head identifies objects, and a segmentation head generates a BEV map showing objects and drivable surfaces. Attributes from both heads are compared, and the segmentation head's weights are updated accordingly, resulting in an updated BEV segmentation map output by the updated segmentation head.

20 Claims, 7 Drawing Sheets

(51) Int. Cl.

| | |
|---|---|
| *G01C 21/00* | (2006.01) |
| *G06V 10/26* | (2022.01) |
| *G06V 10/75* | (2022.01) |
| *G06V 10/77* | (2022.01) |
| *G06V 10/82* | (2022.01) |
| *G06V 20/58* | (2022.01) |
| *G06V 10/774* | (2022.01) |

(52) U.S. Cl.
   CPC ..... *G01C 21/3837* (2020.08); *G01C 21/3859* (2020.08); *G06V 10/26* (2022.01); *G06V 10/751* (2022.01); *G06V 10/7715* (2022.01); *G06V 10/82* (2022.01); *G06V 20/58* (2022.01); *B60W 2050/0028* (2013.01); *B60W 2420/403* (2013.01); *B60W 2554/20* (2020.02); *B60W 2554/4029* (2020.02); *G06V 10/774* (2022.01)

(58) Field of Classification Search
   USPC ......................................................... 701/26
   See application file for complete search history.

(56)                    References Cited

U.S. PATENT DOCUMENTS

| | | | |
|---|---|---|---|
| 2025/0245957 A1* | 7/2025 | Ochoa .................... | G06V 10/44 |
| 2026/0037821 A1* | 2/2026 | Zhao ..................... | G06N 3/092 |
| 2026/0051179 A1* | 2/2026 | Ravi Kumar ........ | G06V 20/584 |

\* cited by examiner

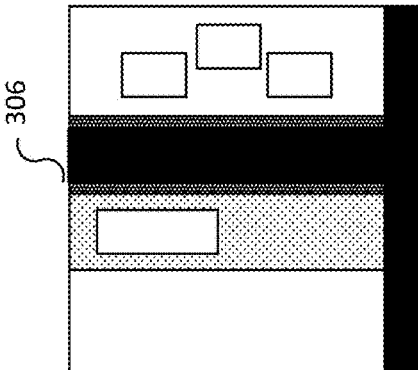
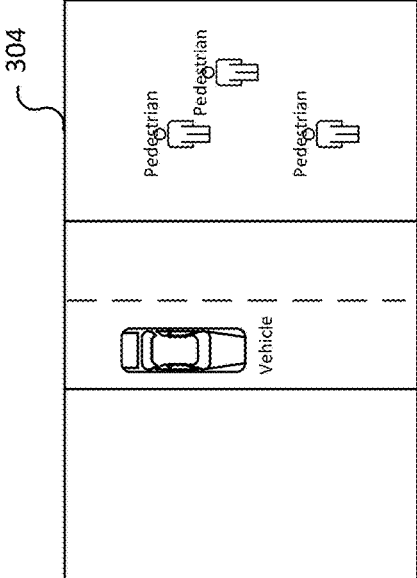
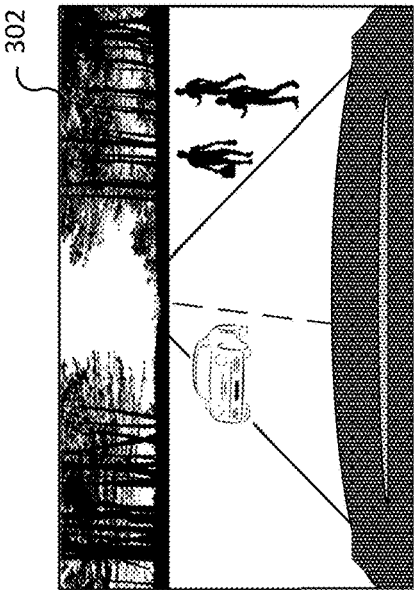
FIG. 3

500

600

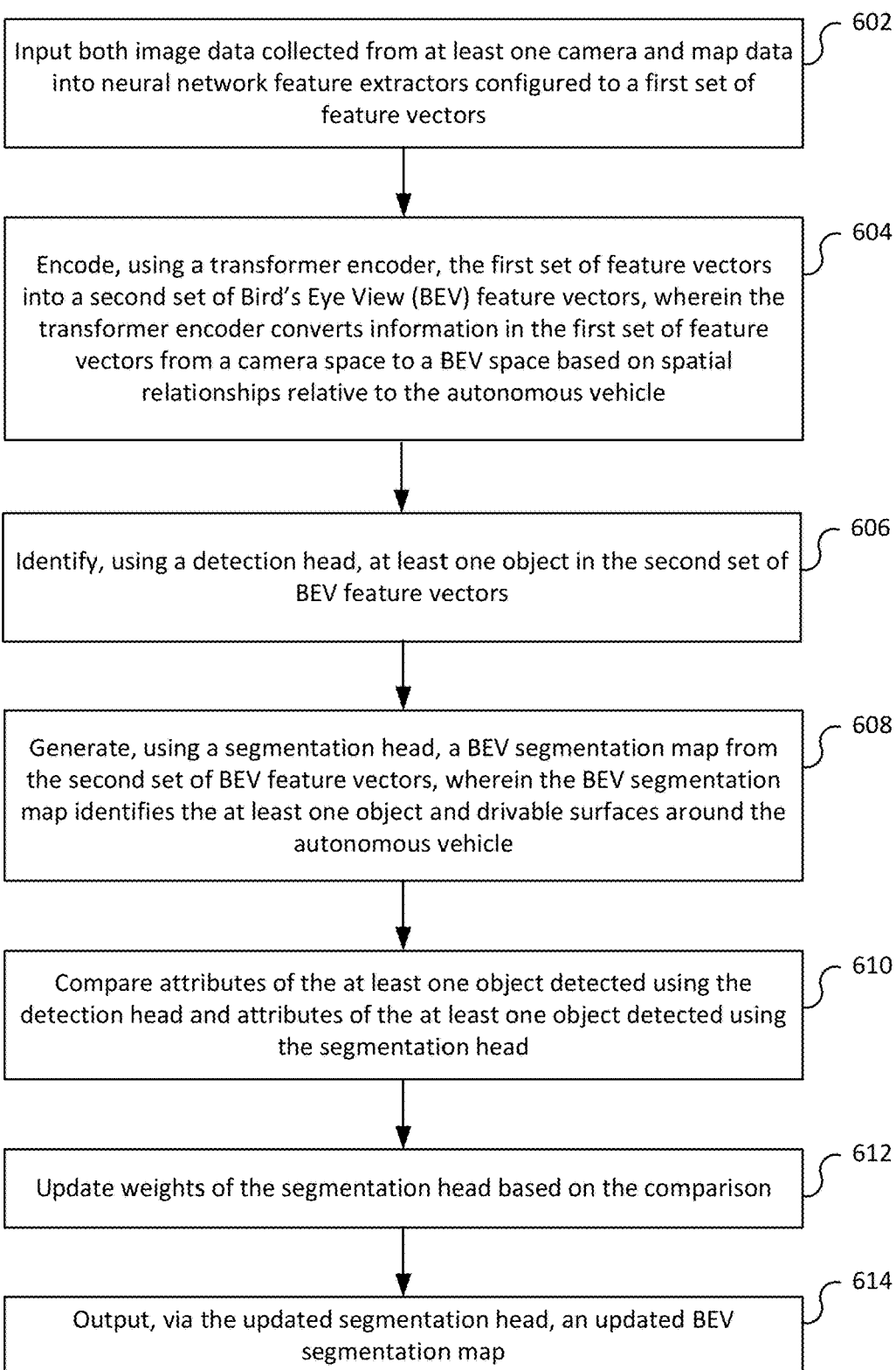

602
Input both image data collected from at least one camera and map data into neural network feature extractors configured to a first set of feature vectors 604
Encode, using a transformer encoder, the first set of feature vectors into a second set of Bird's Eye View (BEV) feature vectors, wherein the transformer encoder converts information in the first set of feature vectors from a camera space to a BEV space based on spatial relationships relative to the autonomous vehicle 606
Identify, using a detection head, at least one object in the second set of BEV feature vectors 608
Generate, using a segmentation head, a BEV segmentation map from the second set of BEV feature vectors, wherein the BEV segmentation map identifies the at least one object and drivable surfaces around the autonomous vehicle 610
Compare attributes of the at least one object detected using the detection head and attributes of the at least one object detected using the segmentation head 612
Update weights of the segmentation head based on the comparison 614
Output, via the updated segmentation head, an updated BEV segmentation map

FIG. 6

SYSTEMS AND METHODS FOR TRAINING A CAMERA-BASED PERCEPTION MODEL USING MACHINE LEARNING

FIELD OF TECHNOLOGY

The present disclosure relates to the field of autonomous vehicles, and, more specifically, to systems and methods for training a camera-based perception model using machine learning.

BACKGROUND

Path-planning for autonomous vehicles presents several technical challenges, particularly when using conventional approaches. One such method, Model Predictive Path Integral (MPPI) control, is a sample-based optimization technique that evaluates numerous potential trajectories, estimates their costs, and selects the optimal path. MPPI combines model predictive control and stochastic optimization, making it suitable for tasks involving complex dynamics and uncertainty. It has applications in robotic motion planning, autonomous vehicles, and reinforcement learning.

However, MPPI's effectiveness heavily relies on accurate cost maps, which present their own set of challenges. A cost map is a function that assigns penalties or rewards to spatial locations, guiding the vehicle's navigation. There are two primary approaches to using cost maps: pre-generated and on-the-fly generation. Pre-generated cost maps require precise localization of the vehicle within the map, necessitating specialized hardware like GNSS-RTK systems. This requirement is impractical for general racing applications due to the high technical demands and costs associated with installing such equipment at racetracks.

Conventional methods relying on precise external positioning devices also have significant drawbacks. GPS, while relatively inexpensive, suffers from low accuracy (+1 to 3 meters) and performance issues in low coverage areas. Vicon systems, which provide precise indoor tracking, do not scale well to the dimensions of a racing track. GNSS-RTK, although capable of providing precise positioning with minimal delay, requires additional hardware installations, such as base stations and on-board receivers, and suffers from low coverage areas.

LIDAR, an on-board sensor that generates point clouds of the surrounding environment, offers another localization method. However, it requires the creation of high-definition (HD) LiDAR maps by driving a LIDAR-enabled vehicle around the track and recording point clouds. This process is costly, requires extensive manual tuning, and the maps need regular maintenance and updates. Additionally, LiDAR is more suited for city driving scenarios where environmental features are abundant. In a race track scenario, the lack of salient features can make reliable localization challenging.

These conventional approaches highlight the need for improved systems and methods that can overcome the limitations of current path-planning techniques in autonomous vehicles.

SUMMARY

Systems and methods of the present disclosure are directed to detecting obstacles and drivable areas by an autonomous vehicle. In a general overview, an image and map data is input into a neural network to extract feature vectors. A transformer encoder converts these vectors from camera space to Bird's Eye View (BEV) space. A detection head identifies objects, and a segmentation head generates a BEV map showing objects and drivable surfaces. Attributes from both heads are compared, and both segmentation and detection heads weights are updated accordingly, resulting in an updated BEV segmentation map output by the updated segmentation head. The systems and methods allow for use of multiple cameras for perception, and improve the quality of costmaps and 3d object detection. The systems and methods further improve the quality of BEV feature vectors.

In one exemplary aspect, the techniques described herein relate to a method for detecting obstacles and drivable area by an autonomous vehicle in motion, the method including: inputting both image data collected from at least one camera and map data into neural network feature extractors configured to output a first set of feature vectors; encoding, using a transformer encoder, the first set of feature vectors into a second set of Bird's Eye View (BEV) feature vectors, wherein the transformer encoder converts information in the first set of feature vectors from a camera space to a BEV space based on spatial relationships relative to the autonomous vehicle; identifying, using a detection head, at least one object in the second set of BEV feature vectors; generating, using a segmentation head, a BEV segmentation map from the second set of BEV feature vectors, wherein the BEV segmentation map identifies the at least one object and drivable surfaces around the autonomous vehicle; comparing attributes of the at least one object detected using the detection head and attributes of the at least one object detected using the segmentation head (in case of inputting batch of image data collected from at least one camera and map data during training phase); updating weights of the segmentation head based on the comparison; and outputting, via the updated segmentation head, an updated BEV segmentation map.

In some aspects, the techniques described herein relate to a method, further including generating a navigation recommendation using a path-planning model configured to process the updated BEV segmentation map.

In some aspects, the techniques described herein relate to a method, wherein the at least one camera is operably coupled with the autonomous vehicle in motion.

In some aspects, the techniques described herein relate to a method, wherein the path-planning model is configured to calculate a plurality of possible paths using a cost model, and wherein generating the navigation recommendation includes selecting a lowest cost path from among the plurality of possible paths based on a change in cost assigned by the path-planning model.

In some aspects, the techniques described herein relate to a method, wherein selecting the lowest cost path includes applying an optimizer using a Monte Carlo approximation.

In some aspects, the techniques described herein relate to a method, wherein the path-planning model is a Model Predictive Path Integral (MPPI) module.

In some aspects, the techniques described herein relate to a method, wherein the transformer encoder is a spatial-cross attention transformer.

In some aspects, the techniques described herein relate to a method, further including: during a training stage of the segmentation head, generating a plurality of training batches, wherein each of the plurality of training batches includes at least one sample with objects to detect.

In some aspects, the techniques described herein relate to a method, wherein attributes of the at least one object include visual features of the at least one object and a position of the at least one object.

In some aspects, the techniques described herein relate to a method, wherein comparing the attributes of the at least one object detected using the detection head and the attributes of the at least one object detected using the segmentation head includes calculating a loss function between both attributes.

In some aspects, the techniques described herein relate to a method, wherein the at least one object is one or more of: a driving obstacle, a landmark, a pedestrian, a sign, a traffic light, another vehicle.

It should be noted that the methods described above may be implemented in a system comprising a hardware processor. Alternatively, the methods may be implemented using computer executable instructions of a non-transitory computer readable medium.

In some aspects, the techniques described herein relate to a system for detecting obstacles and drivable area by an autonomous vehicle in motion, including: at least one memory; at least one hardware processor coupled with the at least one memory and configured, individually or in combination, to: input both image data collected from at least one camera and map data into neural network feature extractors configured to output a first set of feature vectors; encode, using a transformer encoder, the first set of feature vectors into a second set of Bird's Eye View (BEV) feature vectors, wherein the transformer encoder converts information in the first set of feature vectors from a camera space to a BEV space based on spatial relationships relative to the autonomous vehicle; identify, using a detection head, at least one object in the second set of BEV feature vectors; generate, using a segmentation head, a BEV segmentation map from the second set of BEV feature vectors, wherein the BEV segmentation map identifies the at least one object and drivable surfaces around the autonomous vehicle; compare attributes of the at least one object detected using the detection head and attributes of the at least one object detected using the segmentation head; update weights of the segmentation head based on the comparison; and output, via the updated segmentation head, an updated BEV segmentation map.

In some aspects, the techniques described herein relate to a non-transitory computer readable medium storing thereon computer executable instructions for detecting obstacles and drivable area by an autonomous vehicle in motion, including instructions for: inputting both image data collected from at least one camera and map data into neural network feature extractors configured to output a first set of feature vectors; encoding, using a transformer encoder, the first set of feature vectors into a second set of Bird's Eye View (BEV) feature vectors, wherein the transformer encoder converts information in the first set of feature vectors from a camera space to a BEV space based on spatial relationships relative to the autonomous vehicle; identifying, using a detection head, at least one object in the second set of BEV feature vectors; generating, using a segmentation head, a BEV segmentation map from the second set of BEV feature vectors, wherein the BEV segmentation map identifies the at least one object and drivable surfaces around the autonomous vehicle; comparing attributes of the at least one object detected using the detection head and attributes of the at least one object detected using the segmentation head; updating weights of the segmentation head based on the comparison; and outputting, via the updated segmentation head, an updated BEV segmentation map.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 3 is a diagram depicting inputs and outputs of the system.

FIG. 6 illustrates a flow diagram of a method for detecting obstacles and drivable area by an autonomous vehicle in motion.

DETAILED DESCRIPTION

Exemplary aspects are described herein in the context of a system, method, and computer program product for training a multi-camera perception model using machine learning. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
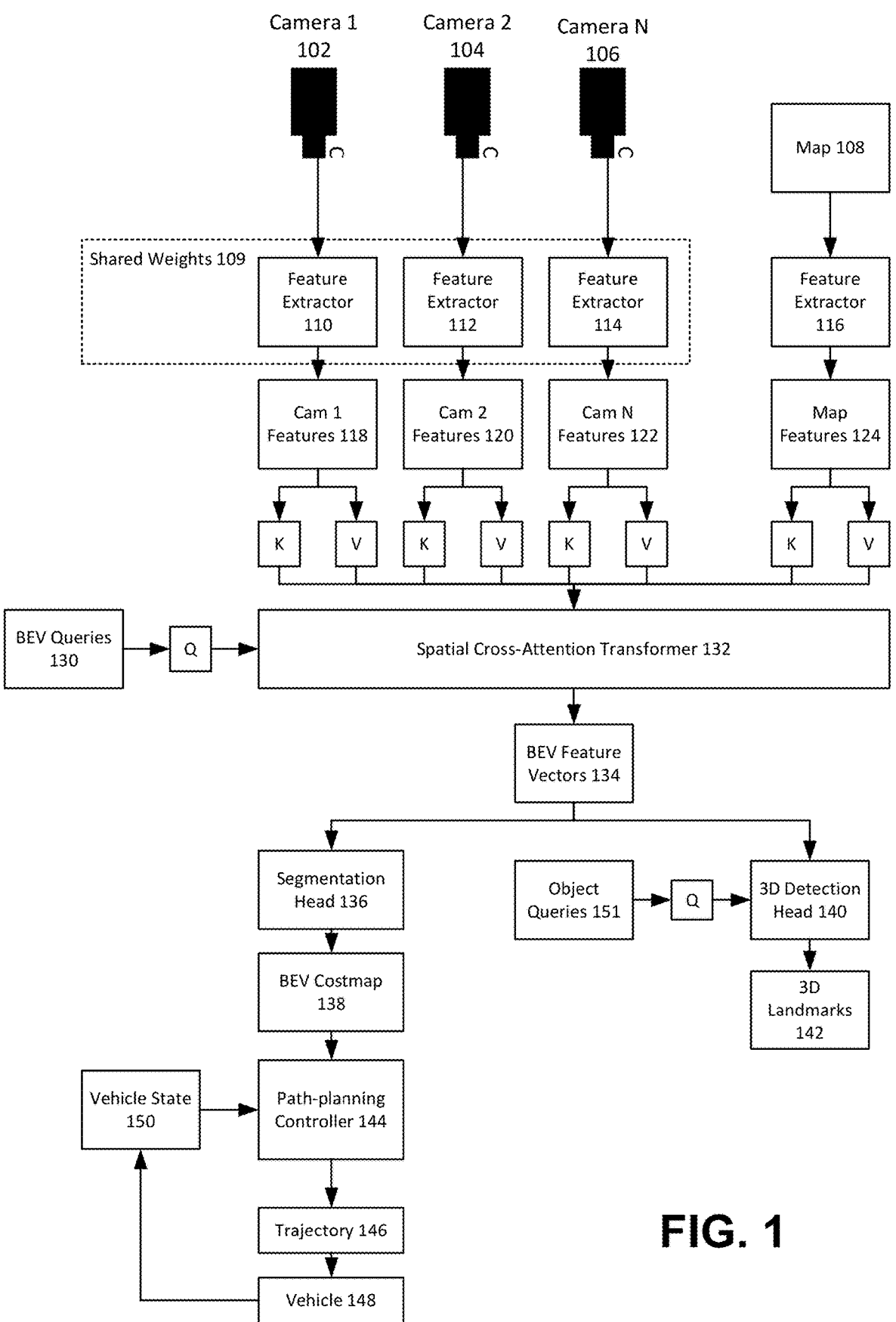
FIG. 1 is a block diagram illustrating a system comprising a perception network.

FIG. 1 is a block diagram illustrating system 100 comprising a perception network 101. From a high-level, FIG. 1 illustrates a complex perception network architecture designed for autonomous driving, which processes data from multiple input sensors, including several cameras and maps. Initially, the network receives inputs from various cameras (Camera 1, Camera 2, Camera N) and a map, which are handled by preprocessing blocks to produce intermediate tensors and outputs. Each camera input then goes through a CNN feature extractor with shared weights to extract features, while the map input is similarly processed to extract map features.

A spatial cross-attention module transforms the information stored in camera feature vectors from camera space into Bird's Eye View (BEV) space, with BEV Queries encoding spatial relationships relative to the ego vehicle. The BEV feature vectors obtained from this module are then input to a 3D Detection Head (DETR Decoder), which produces 3D landmarks, including the positions of vehicles, pedestrians, and traffic signs.

In parallel, a segmentation head uses, for example, a modified Mask2Former architecture to produce a BEV segmentation map from the BEV feature vectors. This branch generates predictions for objects such as vehicles and pedestrians, and also creates a segmentation map for the drivable surface around the ego vehicle. This drivable surface encodes information about the current lane, sidewalk, oncoming traffic lanes, intersections, and more.

To ensure consistency, the system employs mechanisms to verify that both the 3D detection and segmentation branches produce consistent results. During training, self-consistency is maintained by comparing the BEV positions of vehicles and pedestrians from both direct 3D projections and indirect methods, achieved by projecting the results of the 3D detection head into BEV space.

Overall, the system integrates various deep learning components, such as CNNs and transformers, to create a robust perception framework for autonomous vehicles, focusing on accurate detection, segmentation, and consistency of the detected objects.

More specifically, perception network 101 comprises n cameras labeled 1, 2, . . . n (102, 104, 106) and map 108. Cameras 1, 2, . . . n are coupled with corresponding feature extractors using shared weights 109. These feature extractors 110, 112, and 114 take camera image data as inputs and apply shared weights 109. Outside of shared weights 109, map 108 is coupled with feature extractor 116.

The output of camera feature extraction is represented as camera 1 features 118, camera 2 features 120, and camera n features 122. Map features 124 are extracted from features extractor 116. Extracted features are divided into key (K) and value (V) pairs.

BEV queries 130 comprising query (Q) are passed to spatial cross-attention transformer 132. As an example, query (Q) is represented as a local grid around the vehicle. Extracted camera features may be aggregated for each cell of the local grid, coinciding with their position in space with respect to the vehicle.

Spatial cross-attention transformer 132 is a type of neural network architecture that incorporates attention mechanisms to selectively focus on different parts of spatial data. The spatial cross-attention transformer incorporates attention mechanisms to selectively focus on different parts of spatial data. Input spatial data, such as camera images, are divided into smaller segments or patches. Each patch is encoded into a high-dimensional vector, which serves as the input token for the transformer. A self-attention mechanism allows each patch to interact with every other patch. This is done by calculating attention scores that determine the importance of all other patches relative to a given patch. The scores are based on the similarity between patches. Attention scores are used to dynamically weight the input tokens. Patches that are deemed more important receive higher weights, allowing the model to focus on them more. Weighted features are aggregated to form a new representation of the input data, which emphasizes the most relevant parts. Multiple layers of attention mechanisms can be stacked, allowing the model to refine its focus iteratively and capture complex patterns in the data. The transformer uses the aggregated features to output a feature vector.

After the final transformer layer, the model aggregates refined features into a single vector. This vector encapsulates the essential information that the model has learned about the object or scene. The resulting feature vector can then be used for downstream tasks, such as path planning.

Accordingly, the output of spatial cross-attention transformer 132 are BEV feature vectors 134. These feature vectors 134 and passed to segmentation head 136 and BEV costmap 138. Segmentation head 136 is a component of a neural network that is responsible for dividing an image into segments (zoning for the costmap), typically to identify and isolate different objects within the image. This process is known as image segmentation. The segmentation head operates after the feature extraction phase. It uses the extracted features to perform the segmentation task. The segmentation head typically includes a series of convolutional layers, and sometimes deconvolutional layers, to process the feature maps and produce the segmented output.

The present disclosure describes how the spatial cross-attention transformer 132 is trained and further describes the components of segmentation head 136. As mentioned previously, multiple cameras are utilized for perception (e.g., collection of information around the vehicle) and planning. The benefits of the present disclosure include the increase in quality of creating BEV (bird-eye view) feature vectors and building costmaps (e.g., bird-eye view of the area surrounding vehicle).

Feature vectors 134 are also passed to 3D detection head 140, which identifies 3D landmarks 142. In particular, 3D detection head 140 may receive object queries 151. 3D landmarks 142 may include any combination of: 3D positions of vehicles, 3D positions of pedestrians, and 3D positions of traffic signs.

The 3D detection head 140 refers to a component of a neural network designed to detect and localize objects in three dimensions from image data. This involves not only recognizing the object but also determining its position and orientation within the space. The 3D detection head processes features extracted by the neural network and uses them to predict 3D bounding boxes around objects, which include dimensions and orientation, along with the class labels. The head refers to the part of a neural network that is specifically designed to process the extracted features from the input data and perform the task of object detection in three dimensions. In this context, a head is typically the final part of the model that makes predictions based on the learned features. The head usually includes several layers of the neural network that may include fully connected layers or convolutional layers.

Path-planning controller 144 receives BEV costmap 138 as its input. Costmap 138 is used by path-planning controller 144 to calculate trajectory 146, which is then passed to vehicle 148. The current vehicle state 150 is updated and re-fed to path-planning controller 144. Costmap 138 ensures safe and efficient navigation and may take a variety of forms. A grid-based costmaps represents the environment with cells indicating the presence of obstacles. Mathematical functions can be used to define the cost associated with any point in space. Costmap 138 can also incorporate risk and feasibility calculations based on lane and road boundaries. In an embodiment, costmap 138 separates different types of information, such as static and dynamic obstacles, into different layers. The layers are then combined to form a master costmap.

FIG. 1 illustrates a complex perception network architecture designed for autonomous driving. The network processes data from multiple input sensors, including multiple cameras and maps. The first stage involves input sensors and preprocessing. The network receives inputs from various cameras (Camera 1, Camera 2, Camera N) and a map. Preprocessing blocks handle these inputs to produce intermediate tensors and outputs.

The second stage is feature extraction in which each camera input goes through a CNN feature extractor with shared weights to extract features. The map input is similarly processed to extract map features.

In the third stage, a spatial cross-attention module transforms information stored in camera feature vectors from camera-space into BEV-space. BEV queries encode spatial relationships with respect to the ego vehicle.

The fourth stage involves 3D detection in which the BEV feature vectors obtained from the spatial Cross-Attention module are input to a 3D Detection Head (DETR Decoder). The detection head produces 3D landmarks including positions of vehicles, pedestrians, and traffic signs.

The fifth stage involves a segmentation head. A parallel branch uses a modified Mask2Former architecture to produce a BEV segmentation map from BEV feature vectors. Similar to the 3D detection branch, this branch generates predictions for objects such as vehicles, pedestrians, but also generates a segmentation map for the drivable surface around the ego vehicle. This drivable surface encodes information about a current lane that the ego vehicle is driving on, sidewalk, oncoming traffic lanes, intersections, etc.

In the sixth stage involving self-consistency and projection, since there are two sources of predictions for dynamic objects, the system uses certain mechanisms to ensure that both branches produce consistent results. For example, during training, the system ensures self-consistency by comparing BEV positions of vehicles and pedestrians from both direct 3D projections and indirect methods. This is achieved by first projecting the results of the 3D detection head into BEV space. The overall system integrates various deep learning components, such as CNNs and transformers, to create a robust perception framework for autonomous vehicles, focusing on accurate detection, segmentation, and consistency of the detected objects.

Figure 2:
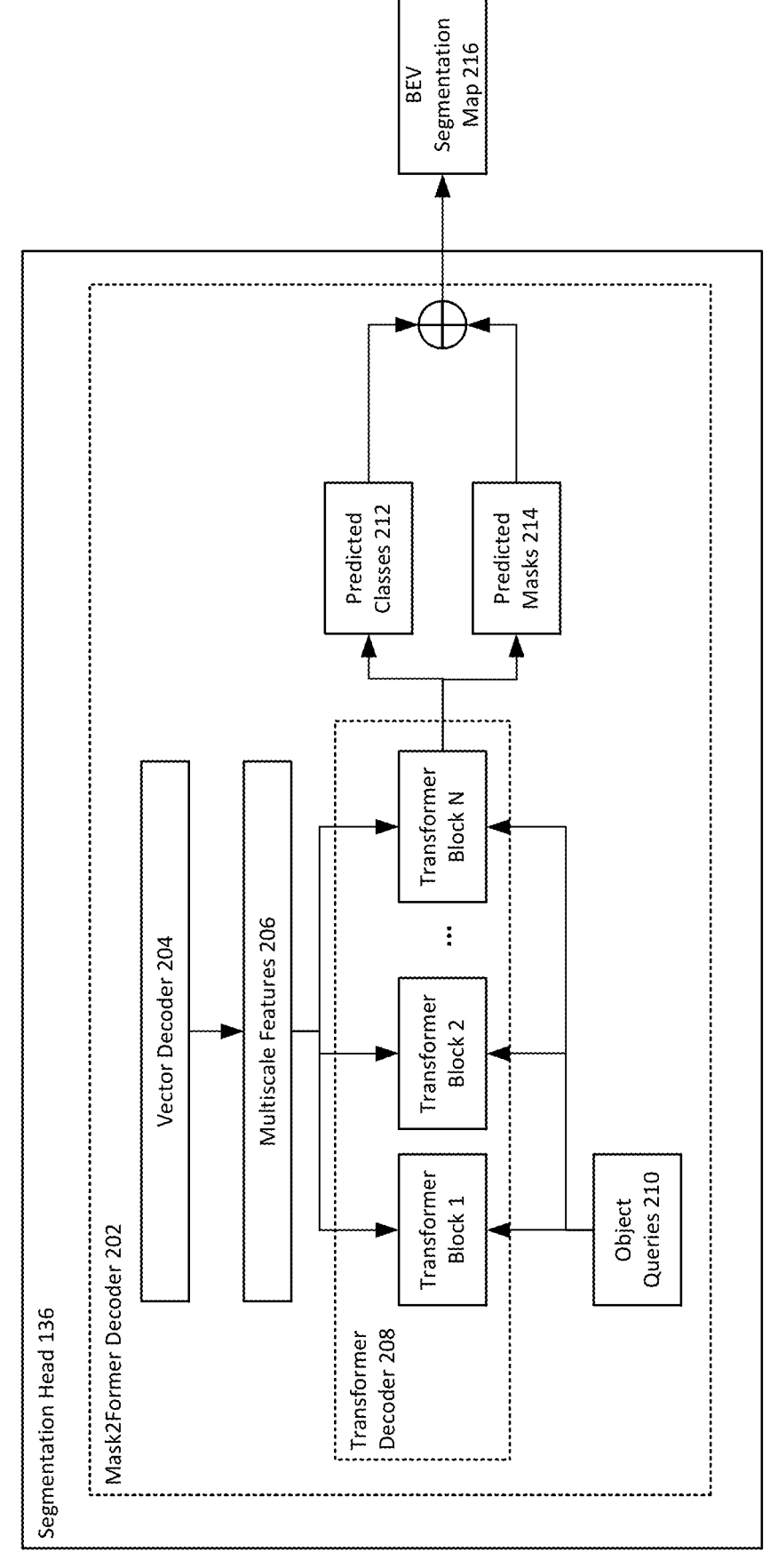
FIG. 2 is a block diagram illustrating the segmentation head in the perception network.

FIG. 2 is a block diagram 200 illustrating the segmentation head 136 in the perception network 101. Segmentation head 136 may comprise Mask2Former decoder 202. In decoder 202, vector decoder 204 generates multiscale features 206, which are used to accurately identify and segment different objects and surfaces in the environment.

More specifically, these features are input into one or more transformer blocks (e.g., transformer blocks 1, 2, . . . , N). Said transformer blocks also receive object queries 210, which may be prompts or questions about the presence and characteristics of objects in the scene. Transformer blocks then generate predicted classes 212 and predicted masks 214. The predicted classes 212 represent the categories of objects identified in the scene, such as vehicles, pedestrians, and various types of drivable spaces. The predicted masks 214, on the other hand, are spatial representations that outline the exact locations and shapes of these objects within the BEV space. Predicted classes 212 and predicted masks 214 are combined to generate BEV segmentation map 216, which may be made up of any combination of BEV positions of vehicles, BEV positions of pedestrians, BEV positions of drivable spaces.

It should be noted that the original Mask2Former could only handle input from a single camera in the camera's pixel space. In contrast, system 100 of the present disclosure can connect a flexible number of cameras and display their inputs in an egocentric space around the car. While conventional systems may work solely with picture inputs using a CNN feature vector, system 100 inputs BEV feature vectors into the Mask2Former decoder.

FIG. 3 is a diagram depicting inputs and outputs of the system. For example, image 302 is input into system 100 (e.g., is captured by a camera). Output 304 is an intermediate output (a 3D head objects output) showing detected objects around the vehicle such as other vehicles and pedestrians. 3D head objects are coded as a vector including various parameters characterizing the object (location coordinates x-y-z, dimensions, classification, confidence in classification % (low % possible false positive).

Output 306 is a costmap with labeled objects. Although a visualization is shown, the costmap is in fact a matrix. In the visualization, the lighter the color, the more dangerous/prohibited the area is for driving. For example, white areas are prohibited, gray areas are possible areas for driving (although not recommended) and the black areas are safe for driving. Output 304 is used later for the perception/predictions pipeline. Output 306 is used in the planning module directly. It should be noted that objects are predicted in both outputs because there is a need for information about objects in the segmentation head to improve segmentation accuracy.

Figure 4:
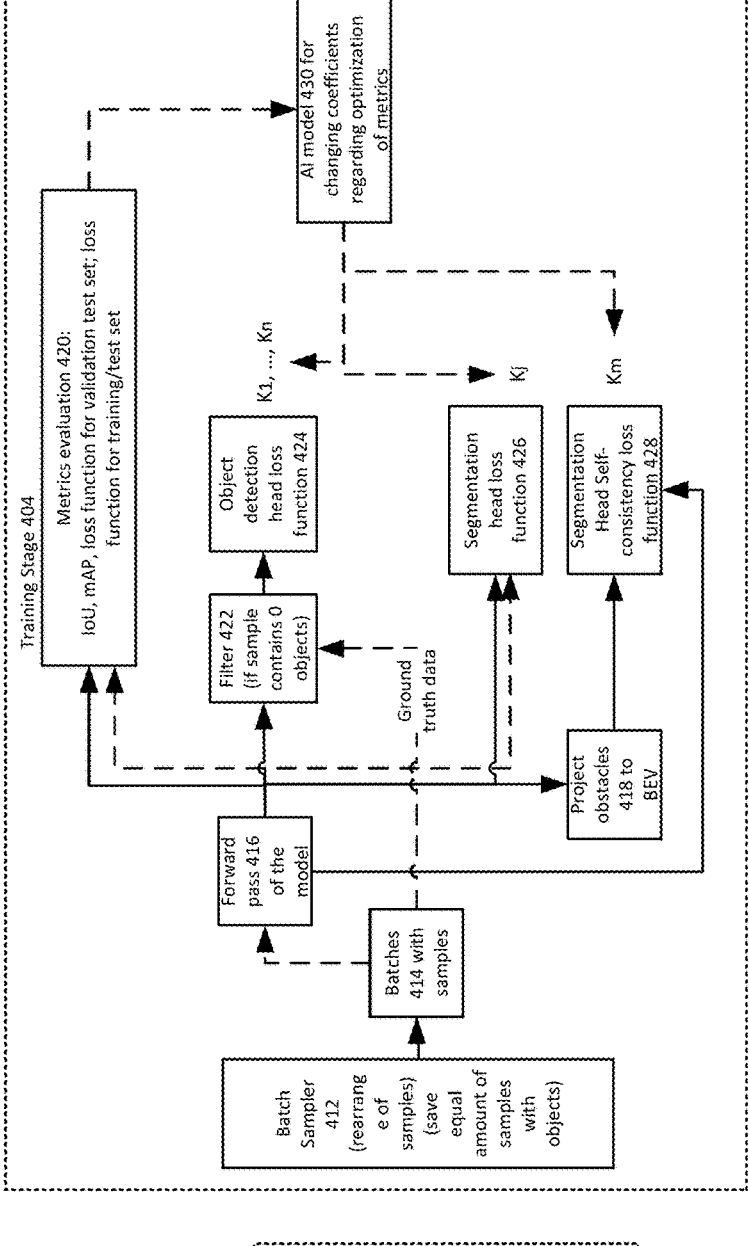
FIG. 4 is a flow diagram depicting a data collection and training stage.

FIG. 4 is a flow diagram 400 depicting a data collection stage 402 and training stage 404. The diagram depicts capturing data by simulating and recording a race or movement of vehicles or traffic. Simulator scenarios 406 include a racetrack, highway, city environment (cars, pedestrians, bicycles, traffic lights), empty scenes (no cars) to train model identify false positives. Driving modelling 408 includes movement and location of cars/pedestrians in different simulated environments (coded by the developer). Alternatively, simulator and drive modeling can be replaced by a real car driving with LIDAR and collecting actual data from different environments. Dataset recording 410 involves selecting filters for selectively recording particular data that is of interested to particular training stage.

First, batch sampler 412 creates samples (short videos or single frames, with additional data) and batches 414 (group of related samples) by: counting samples of data with objects; distributing them among samples in a way which guarantees that there is at least one sample with the object in each batch. Batch 414 are forward passed 416 to filter 422 which receives the ground truth data and filters out samples with no objects. The filtered batches are then used with to calculate an object detection head loss using function 424.

The system then makes predictions, calculates a loss function 426 for predictions for the segmentation head. In some aspects, the system may changing coefficients by an AI model 430 to maximize metrics. The system may further project obstacles 418 from the detection head to the BEV for calculating a segmentation head self-consistency loss function 428 between projection and model prediction.

Metrics evaluation 420 comprises Intersection over Union (IoU), Mean Average Precision (mAP) loss function for validation test, and loss function for training/test set.

Figure 5:
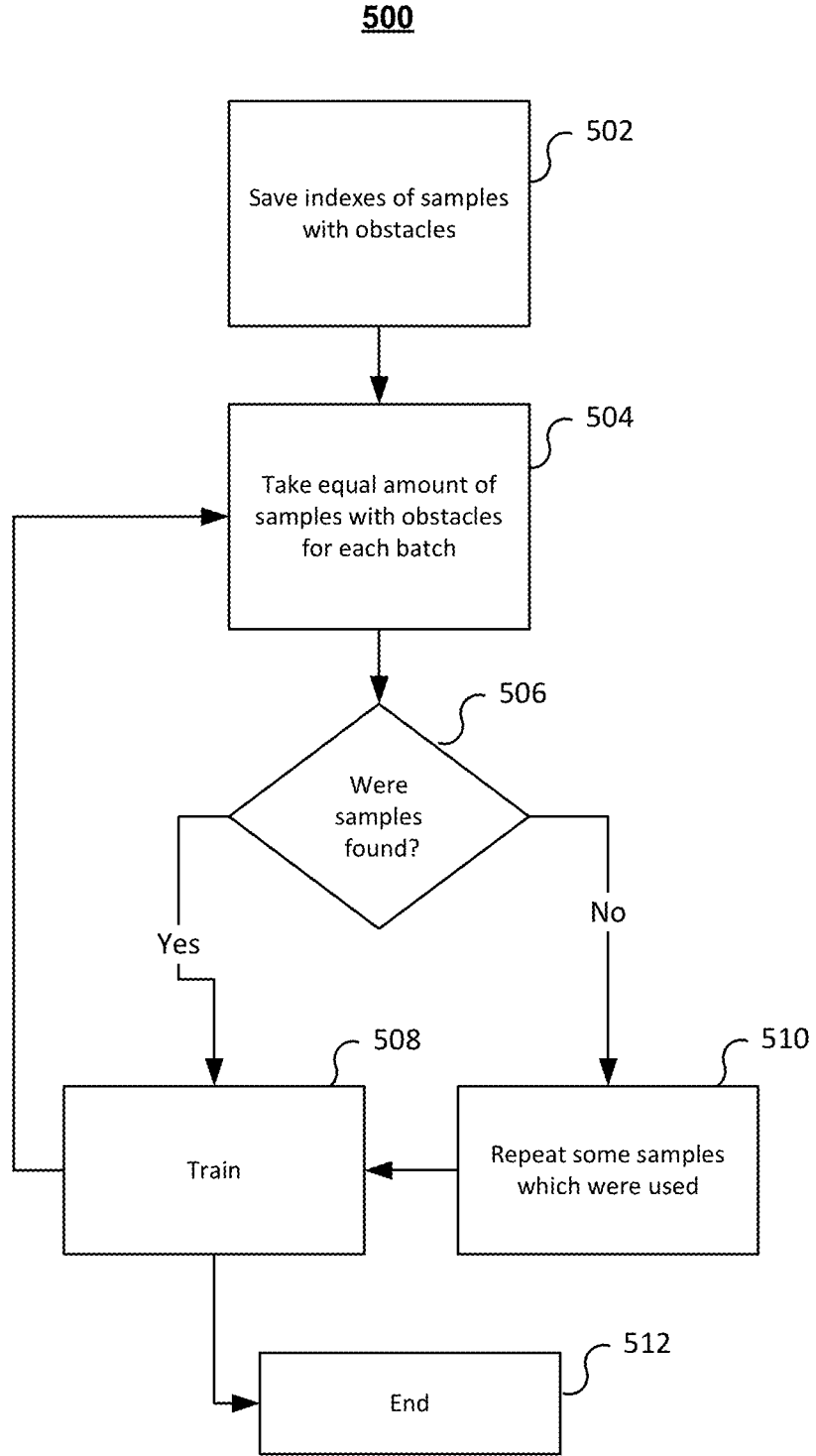
FIG. 5 depicts a flow diagram representing the training stage of the segmentation head.

FIG. 5 depicts a flow diagram of method 500 representing the training stage of the segmentation head 136. The method involves calculating indices for samples including objects. During model training, the generation of training batches occurs, which must meet the following requirement—each batch must include at least one sample with objects. During batch generation, two outcomes are possible. In the first option, the number of samples with objects is sufficient to fill all batches. In this case, the samples are distributed, and training proceeds. Alternatively, if the number of samples with objects is less than the total number of batches in the dataset, some samples will be repeated within one epoch (one cycle of model training in which a set of weights is computed). When modeling is performed, there are several sample videos with no objects in them (useless empty objects). Therefore, certain empty samples must be removed or samples with the object needed to be moved from one batch to another batch.

At 502, indexes of samples with obstacles are saved. At 504, equal amount of samples with obstacles for each batch are taken. At 506, a determination is made whether the samples were found. If yes, method 500 proceeds to 508, where training is performed. Otherwise, method 500 advances to 510, where some samples which were previously used are repeated. From 510, method 500 advances to 508, and from 508, method 500 either returns to 504 (e.g., when the criteria to end training is not met) or advances to 512 (e.g., when training is complete).

FIG. 6 illustrates a flow diagram of method 600 for detecting obstacles and drivable area by an autonomous vehicle (e.g., vehicle 148) in motion. In some aspects, at least one camera is operably coupled with the autonomous vehicle in motion.

At 602, both image data collected from at least one camera (e.g., camera 1 102, camera 2 104, etc.) and map data (e.g., map 108) is input into neural network feature extractors (e.g., feature extractor 110, feature extractor 116, etc.) configured to output a first set of feature vectors (e.g., cam 1 features 118, map features 124, etc.).

At 604, a transformer encoder (e.g., spatial cross-attention transformer 132) encodes the first set of feature vectors into a second set of Bird's Eye View (BEV) feature vectors (e.g., BEV feature vectors 134). The transformer encoder specifically converts information in the first set of feature vectors from a camera space to a BEV space based on spatial relationships relative to the autonomous vehicle.

At 606, a detection head (e.g., 3D detection head 140) identifies at least one object in the second set of BEV feature vectors. In some aspects, the at least one object is one or more of: a driving obstacle, a landmark, a pedestrian, a sign, a traffic light, another vehicle. The list of objects is determined by a training data set and can change (hence it could be different for different data sets).

At 608, a segmentation head (e.g., segmentation head 136) generates a BEV segmentation map (e.g., BEV segmentation map 216) from the second set of BEV feature vectors. The BEV segmentation map identifies the at least one object and drivable surfaces around the autonomous vehicle (see output 306 in FIG. 3). In some aspects, during a training stage of the segmentation head, a plurality of training batches (e.g., batches 414) is generated, wherein each of the plurality of training batches includes at least one sample with objects to detect.

At 610, the attributes of the at least one object detected using the detection head and attributes of the at least one object detected using the segmentation head are compared. For example, a loss function is calculated between both attributes. In some aspects, the attributes of the at least one object include visual features of the at least one object (e.g., size, colors, shapes, etc.) and a position of the at least one object (e.g., pixel coordinates of a bounding box).

The loss function quantifies the difference between the attributes predicted by the detection head and those predicted by the segmentation head. For instance, if the detection head identifies an object as a car with a certain bounding box, and the segmentation head outlines the same object but with slightly different boundaries or attributes, the loss function will calculate the discrepancy between these predictions. The goal is to minimize this loss, thereby refining the model's accuracy. An example of a loss function used in this context could be the Intersection over Union (IoU) for bounding boxes or pixel-wise cross-entropy loss for segmentation masks. By iteratively adjusting the model to reduce this loss, the system becomes more adept at accurately detecting and segmenting vehicles in various conditions, enhancing the reliability of autonomous driving systems.

At 612, the weights of the segmentation head are updated (e.g., to minimize the loss calculated) and improve the performance of the segmentation head.

At 614, using the updated segmentation head, an updated BEV segmentation map is output. This updated BEV segmentation map will be more accurate in identifying the drivable surface and any obstacles in the path of the autonomous vehicle.

In some aspects, a navigation recommendation is then generated using a path-planning model (e.g., path-planning controller 144) configured to process the updated BEV segmentation map. In some aspects, the path-planning model is a Model Predictive Path Integral (MPPI) module.

In some aspects, the path-planning model is configured to calculate a plurality of possible paths using a cost model, and wherein generating the navigation recommendation comprises selecting a lowest cost path from among the plurality of possible paths based on a change in cost assigned by the path-planning model. For example, the path-planning model may provide trajectory 146 to vehicle 148.

In some aspects, selecting the lowest cost path includes applying an optimizer using a Monte Carlo approximation.

Figure 7:
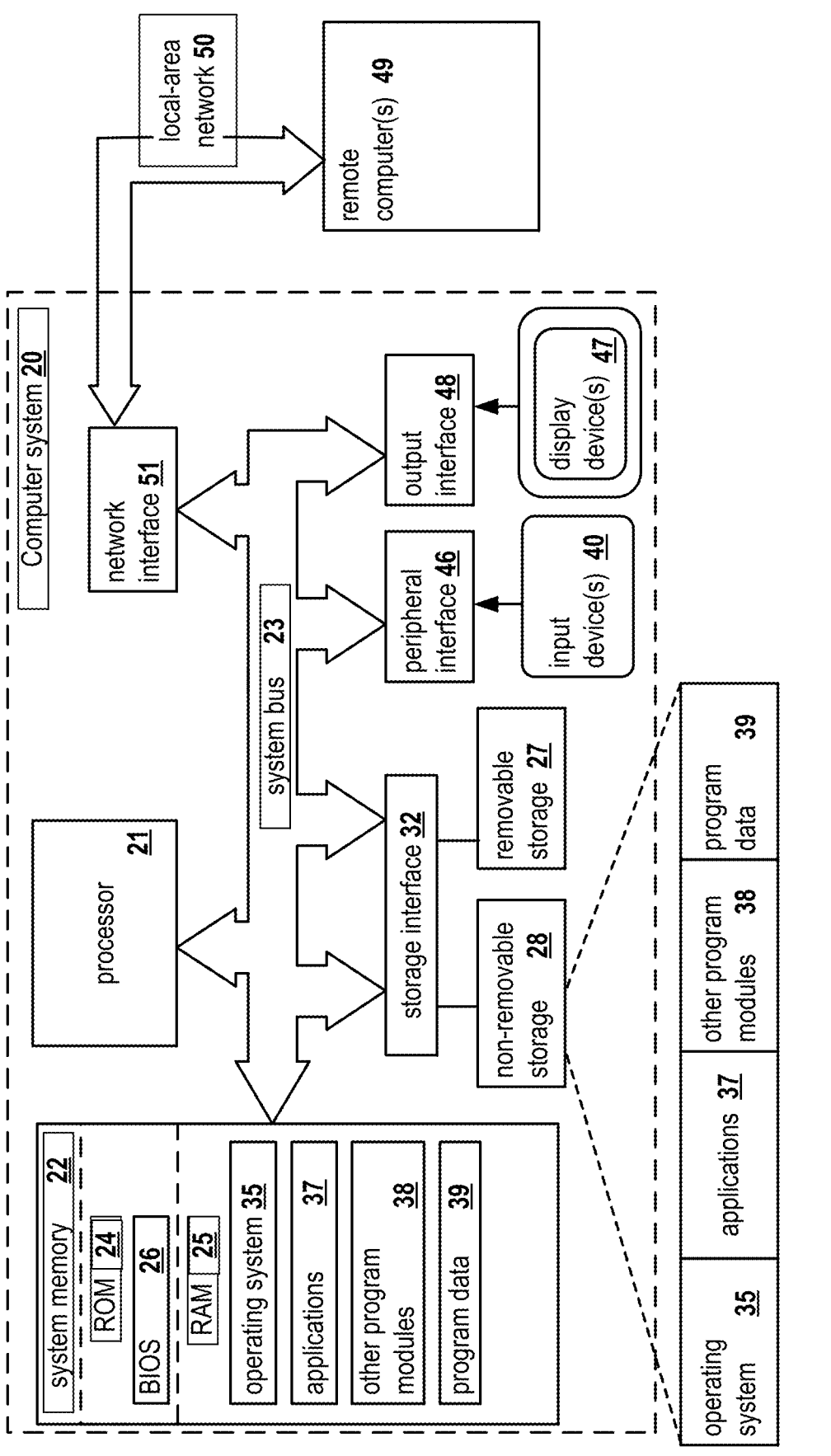
FIG. 7 presents an example of a general-purpose computer system on which aspects of the present disclosure can be implemented.

FIG. 7 is a block diagram illustrating a computer system 20 on which aspects of systems and methods for training a multi-camera perception model using machine learning may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-6 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting obstacles and drivable area by an autonomous vehicle in motion, the method comprising:
   inputting both image data collected from at least one camera and map data into neural network feature extractors configured to output a first set of feature vectors;
   encoding, using a transformer encoder, the first set of feature vectors into a second set of Bird's Eye View (BEV) feature vectors, wherein the transformer encoder converts information in the first set of feature vectors from a camera space to a BEV space based on spatial relationships relative to the autonomous vehicle;
   identifying, using a detection head, at least one object in the second set of BEV feature vectors;
   generating, using a segmentation head, a BEV segmentation map from the second set of BEV feature vectors, wherein the BEV segmentation map identifies the at least one object and drivable surfaces around the autonomous vehicle;
   comparing attributes of the at least one object detected using the detection head and attributes of the at least one object detected using the segmentation head;
   updating weights of the segmentation head based on the comparison; and
   outputting, via the updated segmentation head, an updated BEV segmentation map.

2. The method of claim 1, further comprising generating a navigation recommendation using a path-planning model configured to process the updated BEV segmentation map.

3. The method of claim 1, wherein the at least one camera is operably coupled with the autonomous vehicle in motion.

4. The method of claim 2, wherein the path-planning model is configured to calculate a plurality of possible paths using a cost model, and wherein generating the navigation recommendation comprises selecting a lowest cost path from among the plurality of possible paths based on a change in cost assigned by the path-planning model.

5. The method of claim 4, wherein selecting the lowest cost path includes applying an optimizer using a Monte Carlo approximation.

6. The method of claim 2, wherein the path-planning model is a Model Predictive Path Integral (MPPI) module.

7. The method of claim 1, wherein the transformer encoder is a spatial cross-attention transformer.

8. The method of claim 1, further comprising:
   during a training stage of the segmentation head, generating a plurality of training batches, wherein each of the plurality of training batches includes at least one sample with objects to detect.

9. The method of claim 1, wherein attributes of the at least one object include visual features of the at least one object and a position of the at least one object.

10. The method of claim 1, wherein comparing the attributes of the at least one object detected using the detection head and the attributes of the at least one object detected using the segmentation head comprises calculating a loss function between both attributes.

11. The method of claim 1, wherein the at least one object is one or more of: a driving obstacle, a landmark, a pedestrian, a sign, a traffic light, another vehicle.

12. A system for detecting obstacles and drivable area by an autonomous vehicle in motion, comprising:
   at least one memory;
   at least one hardware processor coupled with the at least one memory and configured, individually or in combination, to:
      input both image data collected from at least one camera and map data into neural network feature extractors configured to output a first set of feature vectors;
      encode, using a transformer encoder, the first set of feature vectors into a second set of Bird's Eye View (BEV) feature vectors, wherein the transformer encoder converts information in the first set of feature vectors from a camera space to a BEV space based on spatial relationships relative to the autonomous vehicle;
      identify, using a detection head, at least one object in the second set of BEV feature vectors;
      generate, using a segmentation head, a BEV segmentation map from the second set of BEV feature vectors, wherein the BEV segmentation map identifies the at least one object and drivable surfaces around the autonomous vehicle;
      compare attributes of the at least one object detected using the detection head and attributes of the at least one object detected using the segmentation head;
      update weights of the segmentation head based on the comparison; and
      output, via the updated segmentation head, an updated BEV segmentation map.

13. The system of claim 12, wherein the at least one hardware processor is further configured to generate a navigation recommendation using a path-planning model configured to process the updated BEV segmentation map.

14. The system of claim 12, wherein the at least one camera is operably coupled with the autonomous vehicle in motion.

15. The system of claim 13, wherein the path-planning model is configured to calculate a plurality of possible paths using a cost model, and wherein generating the navigation recommendation comprises selecting a lowest cost path from among the plurality of possible paths based on a change in cost assigned by the path-planning model.

16. The system of claim 15, wherein the at least one hardware processor is further configured to select the lowest cost path by applying an optimizer using a Monte Carlo approximation.

17. The system of claim 13, wherein the path-planning model is a Model Predictive Path Integral (MPPI) module.

18. The system of claim 12, wherein the transformer encoder is a spatial cross-attention transformer.

19. The system of claim 12, wherein the at least one hardware processor is further configured to:

during a training stage of the segmentation head, generate a plurality of training batches, wherein each of the plurality of training batches includes at least one sample with objects to detect.

20. A non-transitory computer readable medium storing thereon computer executable instructions for detecting obstacles and drivable area by an autonomous vehicle in motion, including instructions for:

inputting both image data collected from at least one camera and map data into neural network feature extractors configured to output a first set of feature vectors;

encoding, using a transformer encoder, the first set of feature vectors into a second set of Bird's Eye View (BEV) feature vectors, wherein the transformer encoder converts information in the first set of feature vectors from a camera space to a BEV space based on spatial relationships relative to the autonomous vehicle;

identifying, using a detection head, at least one object in the second set of BEV feature vectors;

generating, using a segmentation head, a BEV segmentation map from the second set of BEV feature vectors, wherein the BEV segmentation map identifies the at least one object and drivable surfaces around the autonomous vehicle;

comparing attributes of the at least one object detected using the detection head and attributes of the at least one object detected using the segmentation head;

updating weights of the segmentation head based on the comparison; and outputting, via the updated segmentation head, an updated BEV segmentation map.

* * * * *